Patented Jan. 26, 1943

2,309,370

UNITED STATES PATENT OFFICE 2,309,370

HEAT TREATMENT OF VINYLIDENE CHLORIDE POLYMERS

Jack L. Williams, Midland, Mich., assignor to The Dow Chemical Company, Midland, Mich., a corporation of Michigan No Drawing. Application December 12, 1940, Serial No. 369,869

8 Claims. (Cl. 18—48)

This invention relates to a method whereby fabricated articles composed of polymeric vinylidene chloride may be treated to improve their strength properties.

The polymer of vinylidene chloride and many of its co-polymers, plasticized compositions thereof, and methods whereby the same may be produced, are described in U. S. Patents Nos. 2,160,-903-4 and 2,160,931-948. Certain fabricated articles produced from vinylidene chloride polymers are claimed in the co-pending application of R. M. Wiley, Serial No. 211,055, filed May 31, 1938, now U. S. Patent No. 2,233,442. The methods known heretofore whereby vinylidene chloride articles may be treated to improve the strength include those described by R. S. McClurg and D. L. Gibb in U. S. Patent No. 2,176,091 and by R. M. Wiley in U. S. Patents Nos. 2,183,602 and 2,205,449.

The present invention relates in particular to a method whereby thin sheets or films or filamentous articles such as threads, fibers, cordage, and the like, which have been previously stretched and oriented, suitably as described by R. M. Wiley in Patent No. 2,183,602, and in application Serial No. 211,055, may be treated further to improve the tensile strength thereof. The vinylidene chloride compositions here concerned are those which contain "normally crystalline vinylidene chloride polymers." This expression finds definition in the aforesaid application of R. M. Wiley and will be employed herein to designate the polymer of vinylidene chloride and any of its co-polymers which on examination by X-ray diffraction methods are found to exhibit crystalline characteristics. In the following description the term "normally crystalline vinylidene chloride polymers" will be understood to refer not only to the polymers themselves but also to plastic compositions containing the same, e. g., plasticized polymers, or those which have been modified by the addition thereto of such other effect materials as dyes, pigments, or agents to stabilize the polymers against the decompositional effects of light or heat.

While it is a common property of normally crystalline vinylidene chloride polymers that they are capable of forming films or filaments of greater strength than those producible from other polymeric masses which do not exhibit crystallinity on X-ray examination, it is still an aim of those working with vinylidene chloride articles further to improve their tensile strength. It is this aim which constitutes the object of the present invention.

It has now been found that the foregoing object may be attained and that the tensile strength of previously stretched and oriented films or filaments produced from normally crystalline vinylidene chloride polymers may be materially improved by a simple aging and heat treatment prolonged for from 6 hours to about 20 days, in a specific range of moderate temperatures between about 45° C. and about 75° C. These temperatures are considerably below the softening point of the normally crystalline vinylidene chloride polymers, which usually lie in the range form about 120° C. to 190° C.

In accordance with the present invention, a filament or like article which has been formed suitably by extrusion and stretching to provide orientation of the crystals therein, is heated in any suitable medium, which may be a gas, such as air, or a liquid inert to the polymer, such as glycerine, at a temperature between about 45° C. and about 75° C. for a period, varying inversely as the temperature, in the range from 6 hours to 20 days. It has not been found necessary in any instance to employ longer periods of heat treatment than about 20 days and, in general, little, if any, advantage accrues to heating periods extending beyond 15 days, even when operating at temperatures such as 50° C. near the lower end of the herein-claimed range. When the heat treatment is effected, for example, at 70° C., which is near the upper end of the claimed temperature range, it is preferred not to heat beyond 5 days, and little advantage has been found to accrue to a heat treatment at that temperature prolonged beyond 2 days. Noticeably advantageous results are obtained through the use of the present heat treatment, even for periods as short as six hours. Preferred conditions are 50° C. for 1 to 15 days or 70° C. for 6 hours to 2 days.

The invention will be illustrated with reference to the following data which were obtained on a number of samples of extruded and stretched filaments of normally crystalline vinylidene chloride polymers, which filaments had been prepared as described in Patent No. 2,183,602. Some of the polymers employed were prepared by the co-polymerization of vinylidene chloride and vinyl chloride, while others were prepared from various mixtures of vinylidene chloride, ethyl acrylate, and methyl methacrylate. In each case the amount of vinylidene chloride in the co-polymer was greater than 85 per cent and in most instances the vinylidene chloride constituted from 90 to 92 per cent of the co-polymer. Each of the co-polymers reported in the following table had a softening point above 120° C. and a decomposition temperature above 190° C. in the plasticized condition in which they were employed, each sample having been treated with from 2 to 10 per cent of a stabilizing plasticizer such as di-(alpha phenyl-ethyl) ether, or mixtures thereof with phenoxy-propylene oxide. The extruded and stretched samples were cut into 40 inch lengths and wound on sample cards which were placed in an oven having an accurately controlled temperature. Samples were removed for visual observation and mechanical tests at frequent intervals and the data as to tensile strength are reported in the following tables.

TABLE I

*Age treating at 50° C.—Tensile strength in thousands of pounds per square inch*

| Sample No. | Time, days | | | | | | |
|---|---|---|---|---|---|---|---|
| | 0 | 2 | 5 | 15 | 25 | 35 | 75 |
| 1 | 36 | 37 | 45 | 44 | 43.5 | 41 | 35 |
| 2 | 37 | 40 | 41 | 42 | 42.5 | 40 | 42 |
| 3 | 38 | 40 | 40 | 40 | 40 | 42 | 40 |
| 4 | 29 | | | 30 | 37 | 40 | 36 |
| 5 | 23 | 30 | 28 | 29 | 29 | 30 | |
| 6 | 23 | 25 | 26 | 27 | 27 | 24 | 25 |

TABLE II

*Age treating at 70° C.—Tensile strength in thousands of pounds per square inch*

| Sample No. | Time, days | | |
|---|---|---|---|
| | 0 | 1 | 5 |
| 1 | 36 | 37 | 37 |
| 2 | 37 | 39 | 39 |
| 3 | 38 | 40 | 43 |
| 4 | 29 | 33 | 29 |
| 5 | 23 | 29 | 30 |
| 6 | 23 | 25 | 25 |

Similar observations made on other of the crystalline vinylidene chloride polymers confirm the general applicability and advantage of the present method as means for improving the tensile strength of films, filaments, fibers, thread, or twisted or woven cordage prepared from extruded and stretched samples of these polymers. Polymers other than those hereinbefore specifically designated, capable of forming films, filaments, and like articles which may be subjected to the herein-claimed treatment, include copolymers of vinylidene chloride with styrene, vinyl acetate, chloroallyl chloroacetate, vinyl cyanide, and the like, in proportions which exhibit crystallinity on X-ray examination.

Heat treatments carried out at 90° C. on numerous crystalline vinylidene chloride polymers, indicated this to be too high a temperature for safe practical operation while those carried out in the range from 45° to 75° C. uniformly showed tensile strength improvements of several per cent, comparable with those shown in the foregoing tables. Room temperature aging fails to produce the advantageous results here obtained. The combined age-heat treatment of the present invention by its very simplicity is of great advantage and importance in the preparation of fabricated articles of the type described of improved tensile strength.

I claim:

1. The method which comprises age-heat treating a previously stretched article of a normally crystalline vinylidene chloride polymer, at a temperature between about 45° C. and about 75° C., and for a period between about 6 hours and about 20 days, to increase the tensile strength of the article.

2. The method which comprises age-heat treating a previously stretched and oriented filament of a normally crystalline vinylidene chloride polymer at a temperature between about 45° C. and about 75° C., and for a period between about 6 hours and about 20 days, to increase the tensile strength of the filament.

3. The method which comprises age-heat treating a previously stretched film of a normally crystalline vinylidene chloride polymer at a temperature between about 45° C. and 75° C., and for a period between about 6 hours and about 20 days, to increase the tensile strength of the film.

4. The method which comprises age-heat treating a previously stretched article of a normally crystalline vinylidene chloride polymer at a temperature near 50° C. for a period of from 1 to 15 days, to increase the tensile strength of the article.

5. The method which comprises age-heat treating a previously stretched article of a normally crystalline vinylidene chloride polymer at a temperature near 70° C. for a period of from 6 hours to 2 days, to increase the tensile strength of the article.

6. The method claimed in claim 1, wherein the polymeric article is predominantly a normally crystalline vinylidene chloride-vinyl chloride co-polymer.

7. The method claimed in claim 1, wherein the polymeric article is predominantly a normally crystalline vinylidene chloride-ethyl acrylate-methyl methacrylate co-polymer.

8. The method claimed in claim 1, wherein the polymeric article is made of a plasticized normally crystalline vinylidene chloride polymer.

JACK L. WILLIAMS.